(12) United States Patent
Sofue et al.

(10) Patent No.: US 7,343,769 B2
(45) Date of Patent: Mar. 18, 2008

(54) CORRUGATION FORMING METHOD

(75) Inventors: Makoto Sofue, Aichi-ken (JP); Naoki Yoshioka, Aichi-ken (JP); Shinya Tatsumi, Osaka-fu (JP); Makoto Sueishi, Osaka-fu (JP)

(73) Assignees: Toyota Shatai Kabushiki Kaisha (JP); Shin Nippon Koki Kabushiki Kaisha (JP)

( * ) Notice: Subject to any disclaimer, the term of this patent is extended or adjusted under 35 U.S.C. 154(b) by 236 days.

(21) Appl. No.: 11/022,335

(22) Filed: Dec. 22, 2004

(65) Prior Publication Data
US 2006/0022301 A1 Feb. 2, 2006

(30) Foreign Application Priority Data
Dec. 26, 2003 (JP) ............................. 2003-434977

(51) Int. Cl.
*B21D 13/00* (2006.01)
(52) U.S. Cl. .................... 72/379.6; 72/192; 72/198
(58) Field of Classification Search ............ 72/187, 72/190, 191, 192, 195, 196, 197, 198, 379.6
See application file for complete search history.

(56) References Cited

U.S. PATENT DOCUMENTS

| 1,640,147 | A | * | 8/1927 | Stolp et al. ............... 72/186 |
| 1,793,629 | A | * | 2/1931 | Meiselbach ............... 72/192 |
| 3,408,844 | A | * | 11/1968 | Strachauer et al. ........ 72/150 |
| 4,196,046 | A | * | 4/1980 | McConnel ............... 162/362 |
| 4,291,561 | A | * | 9/1981 | Tipper ..................... 72/187 |
| 5,664,450 | A | * | 9/1997 | Stoynoff, Jr. .............. 72/44 |
| 5,983,692 | A | * | 11/1999 | Bruck ..................... 72/187 |
| 6,223,580 | B1 | * | 5/2001 | Kirby ..................... 72/379.6 |

FOREIGN PATENT DOCUMENTS

| JP | 5-337558 A | 12/1993 |
| JP | 9-300373 A | 11/1997 |
| JP | 2002-313354 A | 10/2002 |

* cited by examiner

*Primary Examiner*—Ed Tolan
(74) *Attorney, Agent, or Firm*—Rossi, Kimms & McDowell LLP

(57) ABSTRACT

A corrugation forming apparatus includes, as forming members, a rack tool assembled to a slide table and a pinion tool which rotates with rotation of a shaft. The apparatus also includes, as a displacement synchronization mechanism, a feed rack integrally assembled to the table and a feed pinion gear in meshing engagement with the feed rack. When a handle is rotated, its rotational force is transmitted to the feed rack via the feed pinion gear, so that the rack tool moves along the axial direction, and the pinion tool rotates in synchronism with the movement of the rack tool. This enables forming of successive recesses and projections on the thin metal plate, while reducing ductile cracks and warpage.

18 Claims, 7 Drawing Sheets

CORRUGATION FORMING METHOD

BACKGROUND OF THE INVENTION

1. Field of the Invention

The present invention relates to a corrugation forming apparatus and a corrugation forming method adapted to form a plurality of streaky recesses and projections (i.e., a corrugate shape); in particular, to a corrugation forming apparatus and a corrugation forming method adapted to form a corrugate shape on a thin metal plate, as well as to a metal separator for a fuel cell having a plurality of streaky recesses and projections formed by the corrugation forming method.

2. Description of the Related Art

Heretofore, development of a fuel cell which is compact and exhibits high power generation efficiency has been demanded. For example, a solid polymer fuel cell includes a plurality of stacked cell units each having a sandwich structure composed of a separator having fuel passages, a fuel electrode, a solid polymer membrane, an air electrode, and a separator having air passages. In such a solid polymer fuel cell, the following means can be employed in order to reduce the size of the cell itself and improve power generation efficiency. That is, an example means for reducing the size of the cell is thinning the two separators. Further, an example means for improving power generation efficiency is defining fuel and air passages at fine pitches so as to accelerate reaction between fuel and air.

In order to realize the above-mentioned means, there have been proposed an apparatus and method for manufacturing separators for solid polymer fuel cells, each having a flat portion at the periphery, and a plurality of streaky recesses and projections formed thereon, as shown in, for example, Japanese Patent Application Laid-Open (kokai) No. H2002-313354. The conventional manufacturing apparatus disclosed in this publication has paired upper and lower pre-forming draft rolls at a former stage and paired upper and lower final-forming draft rolls at a latter stage. The pre-forming draft rolls have recesses and projections for previously forming a material to have an iterative cross-sectional shape having successive convex portions and concave portions. The final-forming draft rolls have recesses and projections for finishing the pre-formed material to have a final, iterative cross-sectional shape having successive convex portions and concave portions. In the conventional manufacturing apparatus, when the paired pre-forming draft rolls and the paired final-forming rolls are rotated, the shapes of the recesses and the projections are imparted to the material, thereby manufacturing a separator having an iterative cross-sectional shape having successive convex portions and concave portions.

However, in the conventional manufacturing apparatus and method, since successive projections and recesses are formed in a central portion of a material which has a flat portion at the periphery thereof, in some cases considerable distortion is generated and accumulated in the central portion (in particular, at the boundary between the central portion and the flat portion), possibly leading to generation of ductile cracks. Such ductile cracks become likely to be generated in particular during formation of a fine corrugate shape. Therefore, forming a fine corrugate shape while avoiding ductile cracks requires measures, such as employment of a multi-stage process; i.e., a multi-stage pre-forming process, which may increase cost of production.

SUMMARY OF THE INVENTION

In view of the foregoing problem, an object of the present invention is to provide a corrugation forming apparatus and a corrugation forming method which maintain ductility of a material during formation of a corrugate shape, to thereby form a fine and accurate corrugate shape.

Another object of the present invention is to provide a metal separator for a fuel cell which has a plurality of streaky recesses and projections formed by the corrugation forming method. The present invention improves a corrugation forming apparatus and a corrugation forming method adapted to form streaky recesses and projections on a thin metal plate, to thereby improve a metal separator for a fuel cell formed by the corrugation forming method.

The characteristic features of the present invention are as follows. A thin metal plate (metal separator material) is set between paired forming members which mesh with each other with a predetermined clearance formed therebetween in a thickness direction of the thin metal plate in order to successively form streaky recesses and projections extending along a width direction of the thin metal plate (metal separator material). The set thin metal plate (metal separator material) is fed in such a manner that different portions of the thin metal plate are successively fed to a region where the paired forming members are meshed with each other, while the paired forming members are displaced in a synchronized manner so as to successively form streaky recesses and projections on the thin metal plate (metal separator material). The thin metal plate (metal separator material) having successively formed recesses and projections is removed. In this case, preferably, streaky recesses and projections are successively formed on the thin metal plate (metal separator material), while the thin metal plate fed to the region where the paired forming members are meshed with each other is brought into contact with one of the paired forming members. In this case, preferably, recesses and projections having desired final shapes are successively formed on the thin metal plate (metal separator material) having successively formed streaky recesses and projections. Moreover, in these cases, preferably, the thin metal plate (metal separator material) is a lubrication steel plate composed of a steel plate and a lubrication film formed thereon.

By virtue of these features, recesses and projections can be successively formed over the entire width of the thin metal plate (metal separator material), and a boundary between the corrugation formed portion and the corrugation un-formed portion is not present with respect to the width direction, whereby locally generated large distortion can be reduced. Therefore, ductile cracks or warpage stemming from formation can be effectively suppressed, and a fine corrugate shape can be formed. In addition, since recesses and projections can be successively formed through synchronized motion of the forming members, a fine corrugate shape can be accurately formed without unnecessarily compressing the thin metal plate.

Moreover, forming step can be performed in a state in which the thin metal plate is in contact with one of the forming members, whereby lifting of the thin metal plate can be prevented. Therefore, generation of unnecessary distortion stemming from forming can be suppressed, whereby ductile cracks and warpage can be effectively prevented.

Moreover, after removal of the thin metal plate having successively formed streaky recesses and projections, recesses and projections having desired final shapes can be successively formed (final pressing can be performed) on the thin metal plate. By virtue of this, for example, in the case where fuel cell metal separators are manufactured, the fuel cell metal separators can be accurately formed into a desired shape. Thus, accuracy in assembling the metal separators through stacking can be enhanced. In addition, a sufficient large contact area can be secured between the metal separators, whereby their electricity-conducting performance can be greatly improved. Accordingly, the size of a fuel cell can be reduced, and power generation efficiency can be improved.

Furthermore, since the thin metal plate is a lubrication steel plate, friction which is generated between the thin metal plate (metal separator material) and the forming members can be reduced. Thus, distortion stemming from friction is reduced, which also effectively suppresses ductile cracks and warpage.

According to another feature of the present invention, the paired forming members may be a rack member (rack tool) and a pinion member (pinion tool). In this case, preferably, teeth of the pinion member each have a generally trapezoidal shape in a cross section perpendicular to the axial direction thereof, and teeth of the rack member each have a generally trapezoidal shape in a cross section parallel to the axial direction thereof. More preferably, the teeth of the pinion member each have an involute shape in a cross section perpendicular to the axial direction thereof, and teeth of the rack member each have an involute shape in a cross section parallel to the axial direction thereof.

By virtue of these features, the degree of working of the thin metal plate (metal separator material) by the forming members can be reduced as compared to the case where a thin metal plate is formed into a rectangular shape, whereby distortion generated upon forming can be reduced. Moreover, use of the rack member enables the thin metal plate to be held in contact with the teeth of the rack member during a period from completion of formation and removal of the thin metal plate (metal separator material). Therefore, warpage of the thin metal plate (metal separator material) after formation can be effectively suppressed, and, for example, in the case of production of fuel cell metal separators, easiness of assembly at the time of manufacture of stacks can be enhanced, whereby productivity can be improved. Moreover, through employment of involute tooth shapes, meshing engagement between the forming members can be made smooth, and formation of scratches or the like on the thin metal plate can be prevented.

According to another feature of the present invention, the paired forming members are synchronized by means of a gear mechanism having components which move unitarily with the paired forming members. In this case, preferably, the gear mechanism includes a rack and a pinion gear which mesh with each other.

By virtue of this feature, since the gear mechanism includes mutually meshed components, in particular, a rack and a pinion gear, displacements of the forming members can be reliably synchronized without generation of allowance. Therefore, harmful relative displacement is hardly produced between the forming members, whereby warpage or ductile cracks of the thin metal plate (metal separator material), which would otherwise be produced stemming from such a relative displacement, can be prevented, and fine recesses and projections can be successively formed with high accuracy.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
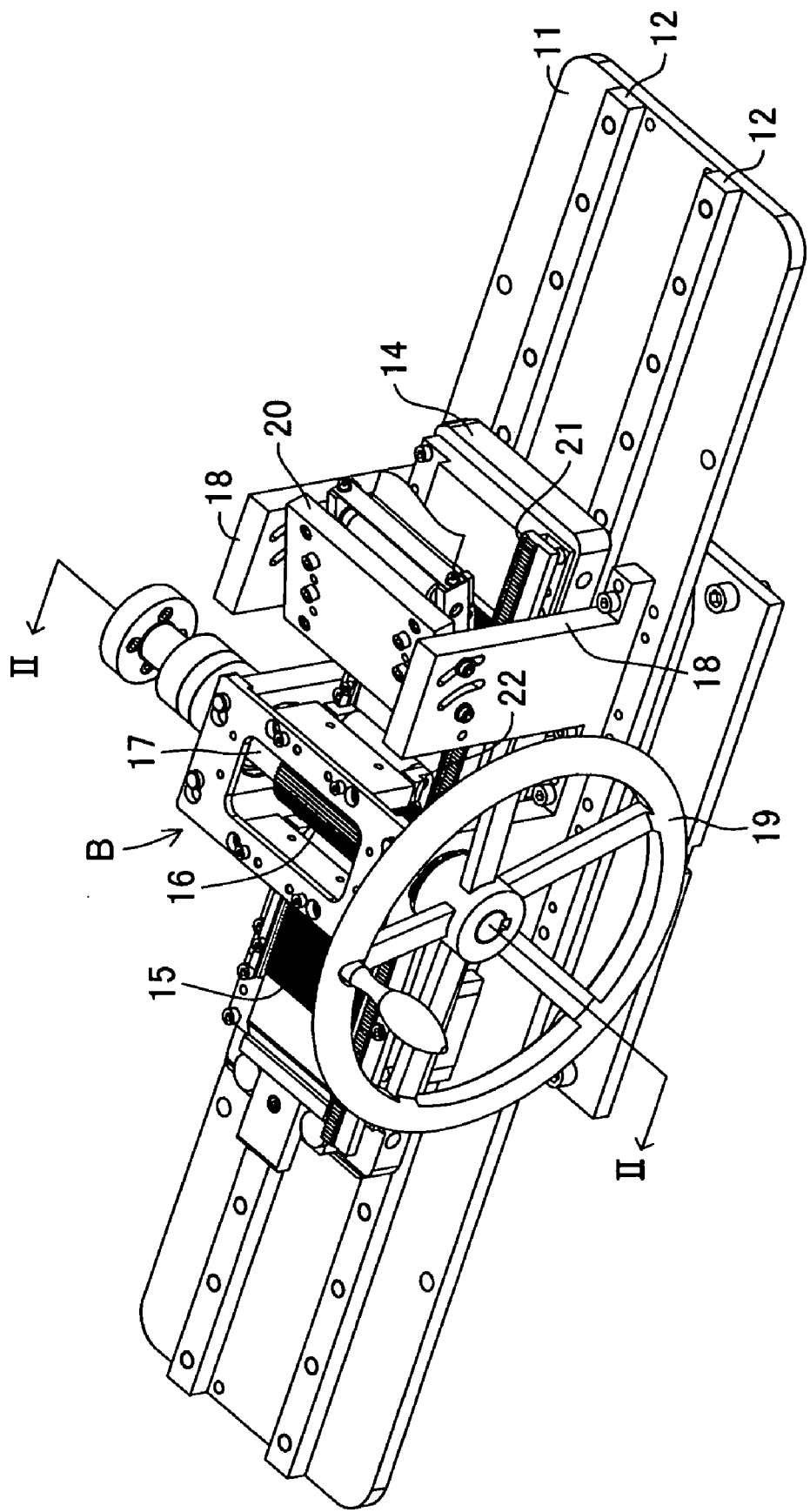
FIG. 1 is a perspective view schematically showing a corrugation forming apparatus according to an embodiment of the present invention.
Figure 2:
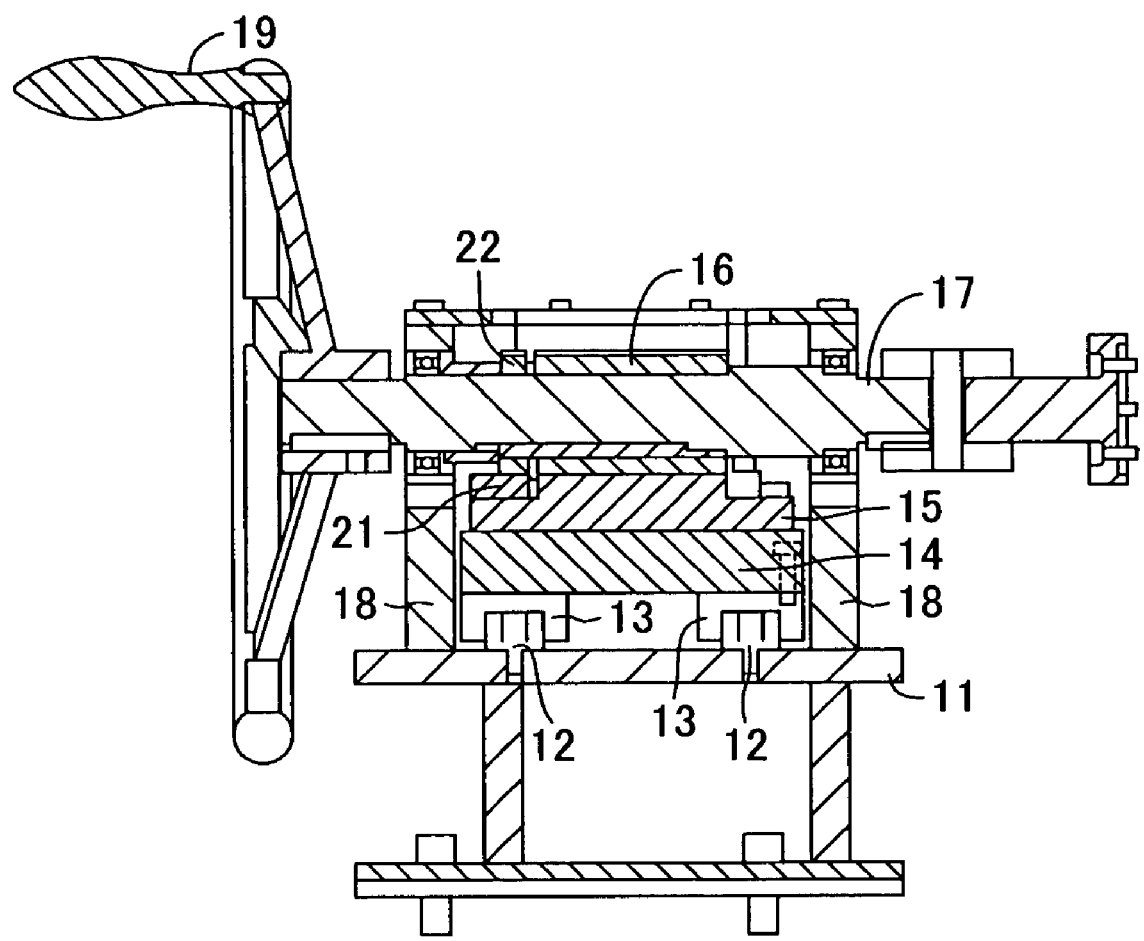
FIG. 2 is a cross-sectional view of the corrugation forming apparatus of FIG. 1, taken along line II-II of FIG. 1.

An embodiment of the present invention will be described with reference to the drawings. FIGS. 1 and 2 show a corrugation forming apparatus A according the embodiment of the present invention which is adapted to successively form recesses and projections on a thin metal plate Z. The corrugation forming apparatus A includes a table 11 fixedly disposed on a base; and a slide table 14 which is supported on the top surface of the table 11 to be slidable along the longitudinal direction of the table 11, via a pair of guide rails 12 secured to the top surface of the table 11 and extending along the longitudinal direction, and a plurality of guide rollers 13.

Figure 3:
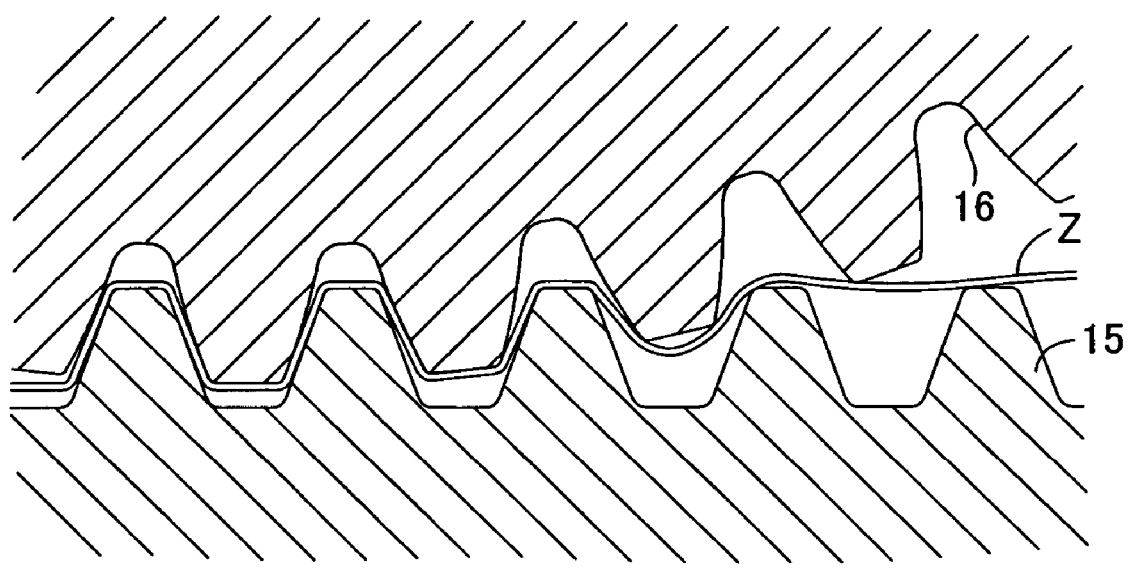
FIG. 3 is a cross-sectional view showing meshing engagement between a rack tool and a pinion tool of the corrugation forming apparatus of FIG. 1.

A rack tool 15 having rack teeth wider than the thin metal plate Z is integrally mounted to the top surface of the slide table 14 by means of bolts. A pinion tool 16 having pinion teeth wider than the thin metal plate Z is disposed above the rack tool 15 so that its pinion teeth are in meshing engagement with the rack teeth. In order to successively form streaky recesses and projections on the thin metal plate Z, as shown in FIG. 3, the rack teeth of the rack tool 15 and the pinion teeth of the pinion tool 16 are in mutual meshing engagement with a predetermined clearance formed therebetween, the clearance being slightly greater than the thickness of the thin metal plate Z. Moreover, in a state in which the rack teeth of the rack tool 15 and the pinion teeth of the pinion tool 16 are in mutual meshing engagement, a clearance greater than the thickness of the thin metal plate Z is formed between the top lands (or bottom lands) of the rack teeth and the bottom lands (or top lands) of the pinion teeth.

As shown in FIG. 3, the rack teeth of the rack tool 15 and the pinion teeth of the pinion tool 16 are involute teeth. Therefore, the rack teeth and the pinion teeth can engage each other in a very smooth manner, and do not impose unnecessary compressive load on the thin metal plate Z when they separate from each other. The rack tool 15 having rack teeth and the pinion tool 16 having pinion teeth serve as the paired forming members of the present invention. In the present embodiment, the rack teeth of the rack tool 15 and the pinion teeth of the pinion tool 16 are involute teeth. However, in some applications, the rack tool 15 and the pinion tool 16 may have teeth having flat flank surfaces and a generally trapezoidal cross section.

As shown in FIGS. 1 and 2, the pinion tool 16 is coaxially assembled to a shaft 17 in such a manner that the pinion tool 16 cannot rotate relative to the shaft 17. The shaft 17 is supported, via bearings, on a pair of standing members 18, which are disposed on the top surface of the slide table 14. The shaft 17 rotates with rotation of a handle 19 assembled to one end of the shaft 17. The standing members 18 each have a squarish-U-like shape; i.e., two upstanding portions. One upstanding portion rotatably supports the shaft 17 via the corresponding bearing. The other upstanding portion adjustably holds a restriction guide 20 for preventing widthwise shift of the thin metal plate Z when supplied.

A feed rack 21 is integrally secured to a side portion (left side portion in FIG. 2) of the rack tool 15 so as to move the slide table 14 and the rack tool 15 along the longitudinal direction of the table 11. The feed rack 21 has rack teeth formed at the same pitch as that of the rack teeth of the rack tool 15. A feed pinion gear 22 is disposed above the feed rack 21, and is coaxially assembled to the shaft 17 to be located adjacent to the pinion tool 16 in such a manner that the feed pinion gear 22 cannot rotate relative to the shaft 17. The feed pinion gear 22 has teeth formed at the same pitch as that of the pinion teeth of the pinion tool 16, and has the same pitch diameter as that of the pinion teeth of the pinion tool 16. The feed pinion gear 22 is meshed with the feed rack 21 in such a manner that no allowance is generated therebetween, and thus, rotation of the feed pinion gear 22 is accurately transmitted to the feed rack 21. The feed rack 21 and the feed pinion gear 22 constitute the displacement synchronization mechanism of the present invention.

Figure 4:
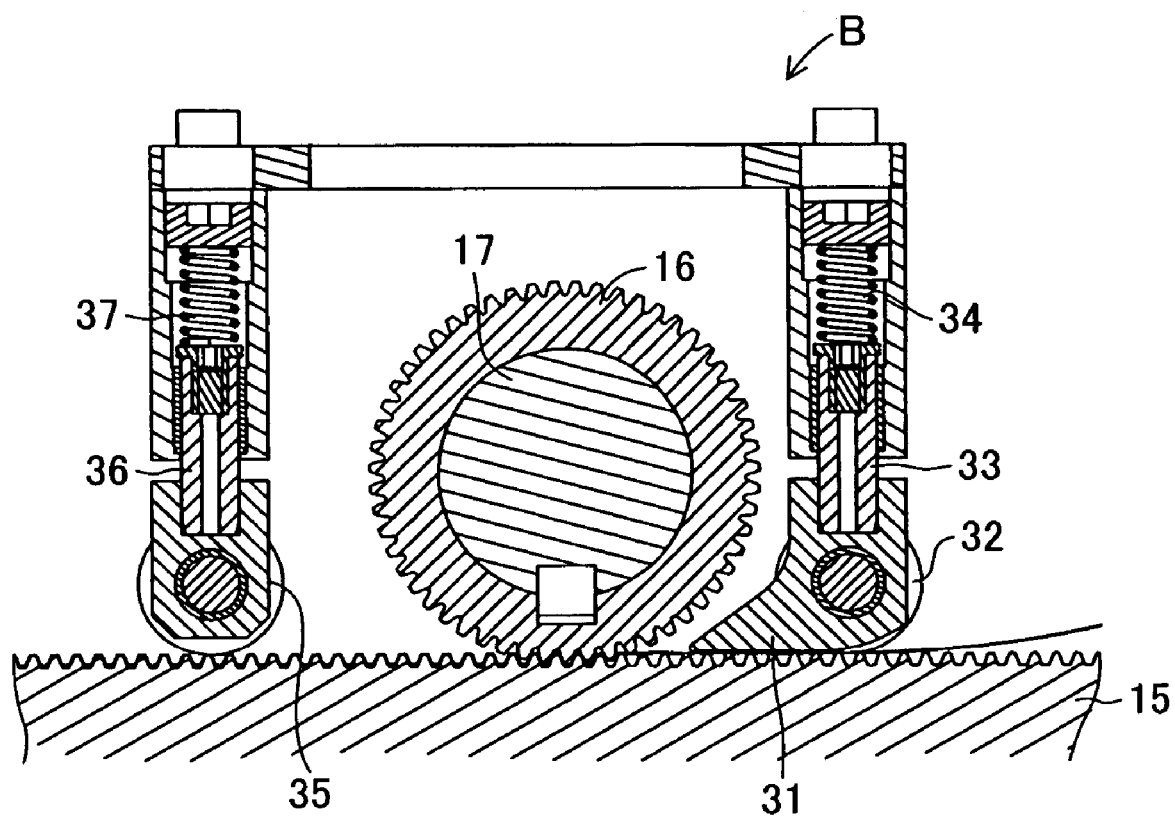
FIG. 4 is a cross sectional view schematically showing a pressing mechanism attached to the corrugation forming apparatus of FIG. 1.

The corrugation forming apparatus A is equipped with a pressing mechanism B for bringing the thin metal plate Z into contact with the rack tool 15 when the thin metal plate Z is fed to a region where the rack tool 15 and the pinion tool 16, which serve as the paired forming members, mesh with each other. As shown in FIG. 4, the pressing mechanism B includes a contact portion 31, a contact roller 32, a shaft 33, and a spring 34, which are disposed on a side from which the thin metal plate Z is fed. The contact portion 31 brings the thin metal plate Z, which is fed to the region where the rack tool 15 and the pinion tool 16 engage each other, into contact with the surface of the rack tool 15 without fail. The contact roller 32 brings the thin metal plate Z, which is fed to the contact portion 31, into contact with the surface of the rack tool 15. The shaft 33 transmits downward urging force of the spring 34 to the contact portion 31 and the contact roller 32.

The pressing mechanism B further includes a pressing roller 35, a shaft 36, and a spring 37, which are disposed on a side to which the thin metal plate Z is discharged. The pressing roller 35 brings the thin metal plate Z, which has recesses and projections successively formed thereon, into contact with the surface of the rack tool 15. The shaft 36 transmits downward urging force of the spring 37 to the pressing roller 35.

Next, with reference to FIGS. 5A to 5D, there will be described a corrugation forming method for successively forming streaky recesses and projections on the thin metal plate Z by use of the corrugation forming apparatus A having the above-described structure. In the following description, the thin metal plate Z is a metal separator material from which a metal separator for a fuel cell is formed. Further, in the following description, the thin metal plate Z is a lubrication steel plate having a lubrication film formed thereon and a thickness of 0.1 mm.

Figure 5A:
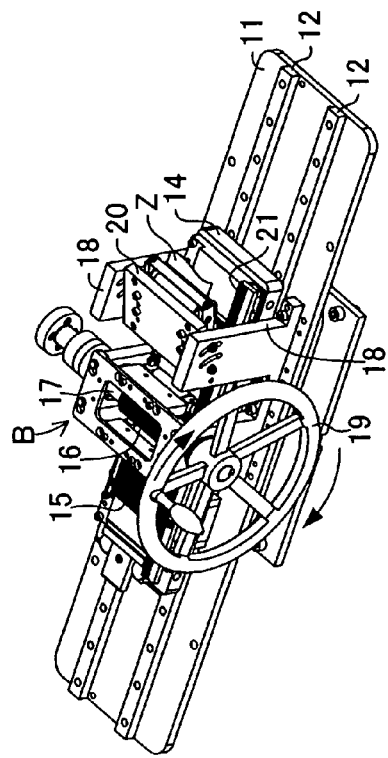
FIGS. 5A to 5D are perspective views for describing a method for forming corrugation by use of the corrugation forming apparatus according to the present invention.

First, a workpiece setting step will be described. In this workpiece setting step, as shown in FIG. 5A, a thin metal plate Z of a strip shape is passed through the restriction plate guide 20, and a front end portion of the thin metal plate Z is fixed to a clamp mechanism provided at one end of the slide table 14; the clamp mechanism will not be described in detail. Before this fixing operation, the slide table 14 (specifically, the rack tool 15) is moved to the right side in FIG. 5A, and the rack teeth of the rack tool 15 and the pinion teeth of the pinion tool 16 are disengaged from each other. Therefore, the thin metal plate Z can easily be passed through a clearance between the rack tool 15 and the pinion tool 16 so as to fix the front end portion of the thin metal plate Z by means of the clamp mechanism. Since the thin metal plate Z is fixed in this manner, recesses and projections can be successively formed on the thin metal plate Z with a small flat portion remaining at the front end portion of the thin metal plate Z.

Figure 5B:
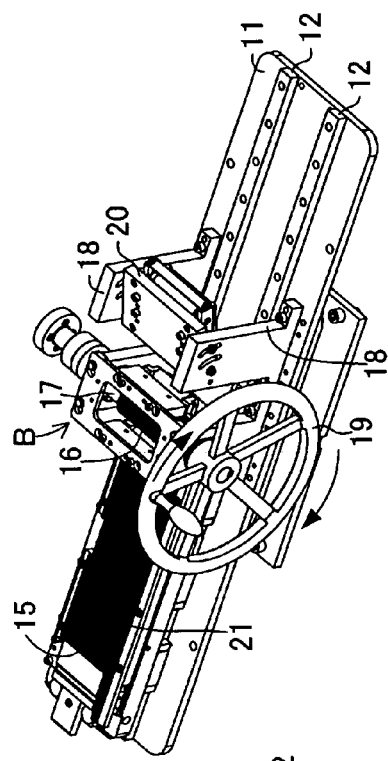

Next, as shown in FIG. 5B, the pressing mechanism B is attached to the corrugate forming apparatus A. That is, the pressing mechanism B is attached to the corrugate forming apparatus A in a condition shown in FIG. 4. Upon attachment of the pressing mechanism B in this manner, the set thin metal plate Z is held in contact with the rack-teeth forming surface of the rack tool 15 by means of the contact portion 31 and the contact roller 32, to which the urging force of the spring 34 is transmitted via the shaft 33. When a forming step is performed as will be described later in a state in which the thin metal plate Z is in contact with the rack-teeth forming surface of the rack tool 15, lifting of the thin metal plate Z is prevented, and thus, recesses and projections are properly formed.

Figure 5C:
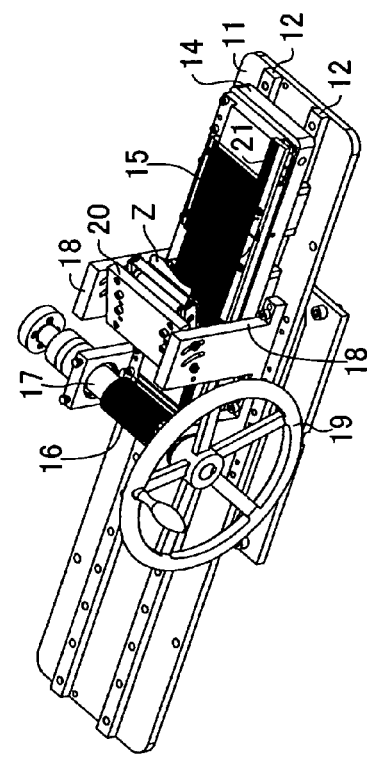
Figure 5D:
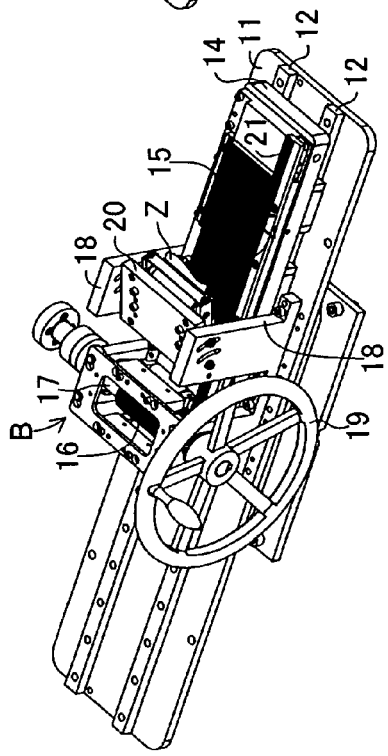

Next, a forming process for successively forming recesses and projections on the thin metal plate Z will be described. As shown in FIGS. 5C and 5D, this forming step is performed by means of rotating the handle 19 in the direction indicated by an arrow. This forming step will be described in detail. When the handle 19 is rotated in the direction indicated by the arrow after the thin metal plate Z and the pressing mechanism B are set in the above-described workpiece setting step, the shaft 17 connected to the handle 19 rotates in the direction of the arrow, so that the pinion tool 16 and the feed pinion gear 22 rotate. At this time, the pinion teeth of the pinion tool 16 are meshed with the rack teeth of the rack tool 15 while a predetermined clearance (e.g., 0.12 mm) is formed therebetween. Meanwhile, the feed pinion gear 22 is meshed with the feed rack 21 in such a manner that no allowance is generated therebetween.

Therefore, upon transmission of rotation of the feed pinion gear 22 to the feed rack 21, the slide table 14 accurately moves along the longitudinal direction of the table 11 in the state in which direct contract does not occur between the pinion teeth of the pinion tool 16 and the rack teeth of the rack tool 15. Moreover, the slide table 14; i.e., the rack tool 15, accurately moves with rotation of the handle 19, and the teeth of the pinion gear 22 and those of the pinion tool 16 have the same pitch diameter. Therefore, the predetermined clearance between the pinion teeth of the pinion tool 16 and the rack teeth of the rack tool 15 does not change; i.e., rotational displacement of the pinion tool 16 is in synchronism with axial displacement of the rack tool 15.

Since the front end portion of the thin metal plate Z has been fixed by means of the clamp mechanism in the workpiece setting step, the thin metal plate Z does not move with respect to the slide table 14 (specifically, the rack tool 15). Therefore, when the slide table 14 accurately displaces upon rotation of the handle 19, the thin metal plate Z is accurately fed to a region where the rack teeth of the rack tool 15 and the pinion teeth of the pinion tool 16 are in mutual meshing engagement. As shown in FIG. 3, in the region where the rack teeth of the rack tool 15 and the pinion teeth of the pinion tool 16 are in mutual meshing engagement, streaky recesses and projections are successively formed on the thin metal plate Z, which is continuously fed upon rotation of the handle 19. Since the thin metal plate Z is a lubrication steel plate, friction at contact portions between the rack teeth of the rack tool 15 and the pinion teeth of the pinion tool 16 can be reduced. Thus, generation of distortion stemming from friction after formation of streaky recesses and projections is reduced, whereby warpage and cracks can be effectively reduced.

The thin metal plate Z discharged from the region where the rack teeth of the rack tool 15 and the pinion teeth of the pinion tool 16 are in mutual meshing engagement is pressed against the rack teeth of the rack tool 15 by means of the pressing roller 35 of the pressing mechanism B. In this manner, after formation of streaky recesses and projections, the thin metal plate Z is held while being pressed against the rack teeth of the rack tool 15. Thus, distortion generated upon forming can be removed to some degree, and warpage and cracks can be reduced effectively.

After completion of the above-described forming step, the thin metal plate Z having undergone forming is removed. On the removed thin metal plate Z, streaky recesses and projections are successively formed, each having a generally trapezoidal cross section similar to that of the rack teeth of the rack tool 15 and the pinion teeth of the pinion tool 16. The thin metal plate Z pre-formed in this manner is finished by means of a final pressing step, whereby a metal separator for a fuel cell is obtained. Although this final pressing step will be described below, description of a detailed structure and operation therefor will be omitted, because the final pressing step is a so-called press forming step.

Figure 6:
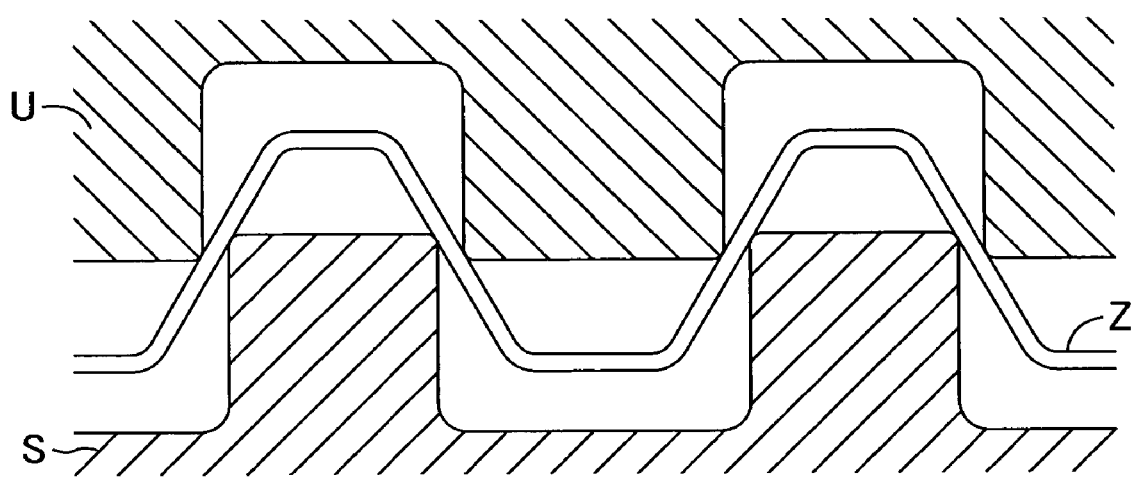
FIG. 6 is a schematic cross-sectional view for describing a final pressing step.

The final pressing step is a step for finally forming the preformed thin metal plate Z into the shape of a fuel cell metal separator. The preformed thin metal plate Z is press-formed by use of an upper die U and a lower die S, which have the shape of a flat plate. As shown in FIG. 6, a plurality of recesses and projections are formed on the upper die U and the lower die S, and the recesses and projections have generally rectangular cross sections corresponding to the desired shape of the fuel cell metal separator. The preformed thin metal plate Z is placed on the lower die S, and the upper die U is lowered and pressed against the lower die S, whereby a fuel cell metal separator having the desired shape is obtained. Even when the thin metal plate Z is press-formed by means of the upper die U and the lower die S during this final pressing step, formation of cracks or scratches can be effectively prevented, because the thin metal plate Z is a lubrication steel plate.

As is understood from the above description, since the corrugation forming apparatus A according to the present invention can successively form recesses and projections over the entire width of the thin metal plate Z, a boundary between the corrugation formed portion and the corrugation un-formed portion is not present with respect to the width direction, whereby locally generated large distortion can be reduced. Therefore, ductile cracks and warpage stemming from formation can be effectively suppressed, and a fine corrugate shape can be formed. In addition, since recesses and projections can be successively formed through synchronized motion of the rack tool 15 and the pinion tool 16, a fine corrugate shape can be accurately formed.

Moreover, after removal of the thin metal plate Z having successively formed recesses and projections, recesses and projections each having a final shape are successively formed (i.e., final pressing is performed) on the thin metal plate Z. Thus, when fuel cell metal separators are manufactured, the fuel cell metal separators can be accurately formed into a desired shape. As a result, accuracy in assembling metal separators together through stacking can be improved, and a sufficient large contact area can be secured between the metal separators, whereby their electricity-conducting performance can be greatly improved. Accordingly, the size of a resultant fuel cell can be reduced, and power generation efficiency can be improved. Furthermore, since the thin metal plate Z is a lubrication steel plate, friction which is generated between the thin metal plate Z and the rack teeth of the rack tool 15 or the pinion teeth of the pinion tool 16 during the formation steps can be reduced. Thus, distortion stemming from friction is reduced, which also effectively suppresses ductile cracks and warpage stemming from formation.

Since the rack teeth of the rack tool 15 and the pinion teeth of the pinion tool 16 are involute teeth which has a generally trapezoidal shape, the degree of working of the thin metal plate Z by means of the rack tool 15 and the pinion tool 16 can be reduced. Therefore, distortion generated in the thin metal plate Z stemming from formation can be reduced. Moreover, use of the rack tool 15 enables the thin metal plate Z to be held in contact with the rack teeth of the rack tool 15 during a period from completion of formation and removal of the thin metal plate Z. Therefore, warpage of the thin metal plate Z after formation can be effectively suppressed, and, for example, in the case of production of fuel cell metal separators, easiness of assembly at the time of manufacture of stacks can be enhanced, whereby productivity can be improved.

Moreover, through employment of a gear mechanism composed of the feed rack 21 and the feed pinion gear 22 as a displacement synchronization mechanism, displacements of the rack tool 15 and the pinion tool 16 can be reliably synchronized. Therefore, warpage or ductile cracks of the thin metal plate Z, which would otherwise be generated because of relative displacement between the rack tool 15 and pinion tool 16, can be prevented, and fine recesses and projections can be successively formed with high accuracy. In the above-described embodiment, the corrugation forming apparatus is configured in such a manner that an operator rotates the handle 19 in order to rotate the shaft 17. However, the corrugation forming apparatus may be configured to rotate the shaft 17 by use of an electric motor in place of the handle 19.

Further, the corrugation forming apparatus may be configured in such a manner that the rack tool 15 is unslidable, and the pinion tool 16 is moved relatively along the axial direction of the rack tool 15. In such a case, the apparatus is configured such that the standing members 18 can move relative to the table 11 along the longitudinal direction thereof. Specifically, the standing members 18 are attached to the table 11 via the guide rails 12 and the guide rollers 13, and the feed rack 21 is attached thereto. By virtue of this configuration, when rotation of the feed pinion gear 22 is transmitted to the feed rack 21, the standing members 18 move relative to the table 11, so that the pinion tool 16 moves relative to the rack tool 15. As a result, recesses and projections are successively formed on the thin metal plate Z.

Figure 7A:
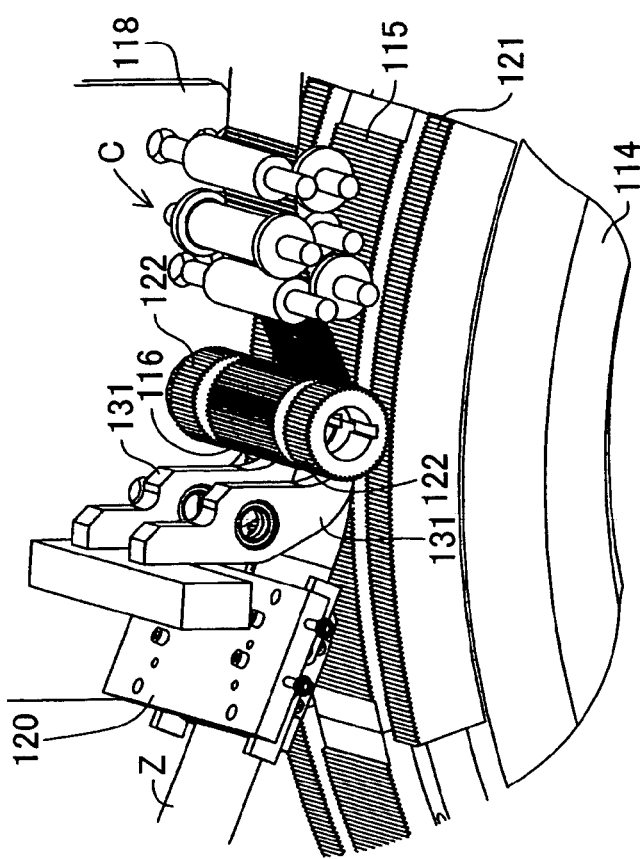
FIGS. 7A and 7B are perspective views showing a corrugation forming apparatus according to a modification of the present invention.
Figure 7B:
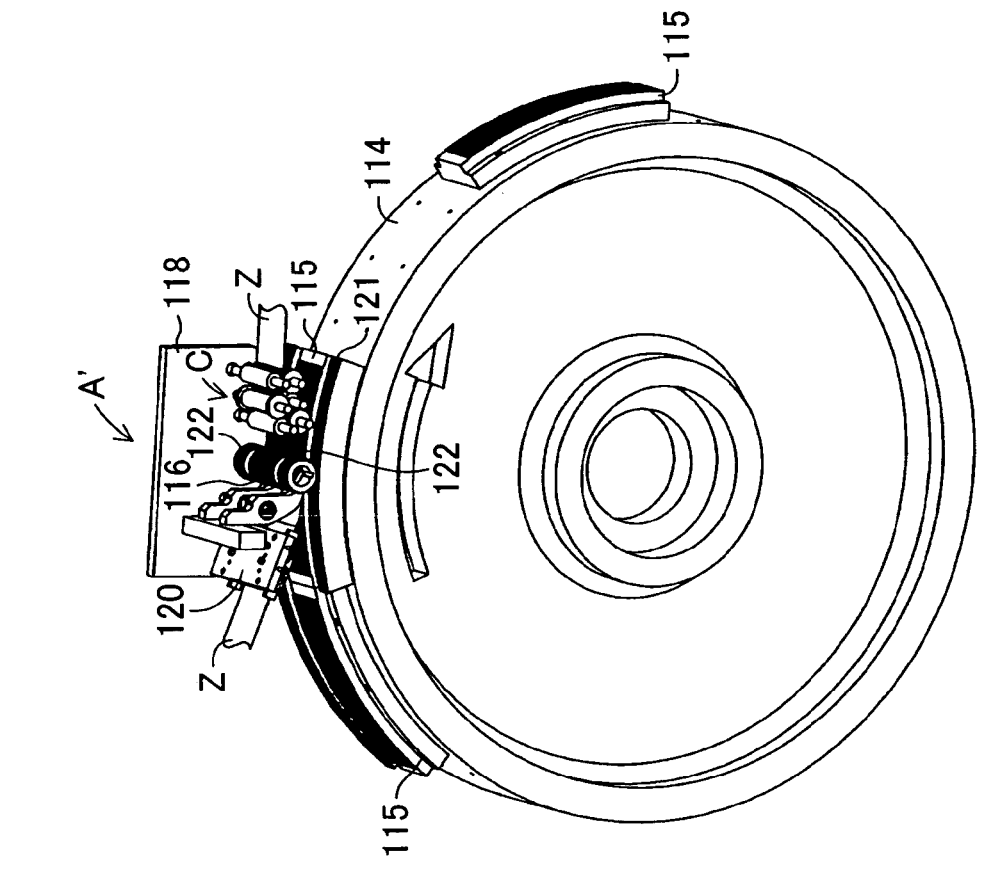

In the above-described embodiment, the corrugation forming apparatus A employs the rack tool 15 so as to successively form streaky recesses and projections, and the rack tool 15 has a flat, plate-like shape. However, in order to attain higher productivity as compared with the corrugation forming apparatus A, it is desired to continuously feed a thin metal plate Z, which is wound in the form of coil, and successively form streaky recesses and projections on the thin metal plate Z. In such a case, as shown in FIGS. 7A and 7B, a corrugation forming apparatus A' of a continuous forming type is employed. Although this modification will be described below, portions substantially identical with those of the above-described embodiment are denoted by corresponding reference numerals, and their detailed descriptions are omitted.

The corrugation forming apparatus A' includes a wheel 114 corresponding to the slide table 14 of the above-described embodiment. The wheel 114 is rotated at a constant speed by means of an unillustrated electric motor. A plurality (three in FIG. 7A) of rack tools 115 can be attached to the outer circumference of the wheel 114 at desired intervals. As shown in FIG. 7B on an enlarged scale, unlike the rack tool 15 of the above-described embodiment, the rack tool 115 attached to the corrugation forming apparatus A' has rack teeth formed on an arcuate surface thereof, because of its manner of attachment.

A pinion tool 116 is disposed above the rack tool 115, and has pinion teeth formed thereon, which teeth mesh with the teeth of the rack tool 115. The pinion tool 116 is coaxially assembled to an unillustrated shaft in such a manner that the pinion tool 116 cannot rotate relative to the shaft. The rack tool 115 and the pinion tool 116 serve as the paired forming members of the present invention. A support plate 118 corresponding to the standing members 18 of the above-described embodiment is provided on one side of the wheel 114. The above-described shaft and a restriction guide 120 are attached to the support plate 118.

An arcuate feed rack 121 is integrally secured to a side portion of each rack tool 115. A feed pinion gear 122 to be meshed with the feed rack 121 is provided above the feed rack 121. This feed pinion gear 122 is also coaxially assembled to the above-mentioned, unillustrated shaft in such a manner that the feed pinion gear 122 cannot rotate relative to the shaft. The teeth of the feed pinion gear 122 have the same pitch diameter as that of the pinion teeth of the pinion tool 116.

The corrugation forming apparatus A' has a contact portion 131 corresponding to the contact portion 31 of the pressing mechanism B of the above-described embodiment. Further, the corrugation forming apparatus A' has a receiving guide mechanism C which receives and conveys the formed thin metal plate Z without imposing unnecessary tensile load on the thin metal plate Z. The receiving guide mechanism C is composed of a plurality of rollers, which are rotatably assembled to the support plate 118.

The corrugation forming apparatus A' differs from the apparatus of the above-described embodiment in that the thin metal plate Z is continuously fed from the coil, and drive force is transmitted to the rack tool 115 side. However, the remaining portions operate in the same manner as in the above-described embodiment. Therefore, through performance of a step similar to the pre-forming step of the above-described embodiment, recesses and projections can be successively formed on the thin metal plate Z. Subsequently, the thin metal plate Z having undergone the pre-forming step is cut to a predetermined length, and then subjected to a final pressing step, whereby a fuel cell metal separator is fabricated. Therefore, effects similar to those attained in the above-described embodiment can be attained. In addition, since pre-forming can be continuously performed on the thin metal plate Z supplied from the coil, productivity can be greatly increased.

The present invention is not limited to the above-described embodiment and modification, and various other modifications are possible.

What is claimed is:

1. A corrugation forming method of forming streaky recesses and projections on a thin metal plate, the method comprising the steps of:
   providing a first pair of meshing members that mesh with each other with a predetermined clearance therebetween, the predetermined clearance being greater than the thickness of the thin metal plate;
   placing the thin metal plate between the first meshing members;
   displacing one of the first meshing members relative to the other of the first meshing members in synchronism while the thin metal plate is placed between the first meshing members to successively form streaky recesses and projections along the entire width of the thin metal plate; and
   removing the thin metal plate having successively formed recesses and projections,
   wherein the first meshing members are driven in synchronism with a displacement synchronization mechanism that includes a second pair of meshing members,
   wherein one of the second meshing members is fixed relative to the one of the first meshing members and the other of the second meshing members is fixed relative to the other of the first meshing members, and
   wherein the second meshing members mesh with each other with no allowance therebetween to accurately displace the one of the first meshing members relative to the other of the first meshing members.

2. A corrugation forming method according to claim 1, wherein the thin metal plate is fed to the region where the first meshing members mesh with each other, while the thin metal plate is brought into contact with the one of the first meshing members.

3. A corrugation forming method according to claim 1 or 2, further comprising the step of successively forming recesses and projections having desired final shapes on the thin metal plate.

4. A corrugation forming method according to claim 1, wherein the first meshing members comprise rack and pinion members each having teeth.

5. A corrugation forming method according to claim 4, wherein the teeth of the pinion member each have a generally trapezoidally shaped cross section, and the teeth of the rack member each have a generally trapezoidally shaped cross section.

6. A corrugation forming method according to claim 4, wherein the teeth of the pinion member each have an involute shaped cross section, and the teeth of the rack member each have an involute shaped cross section.

7. A corrugation forming method according to claim 1, wherein the second meshing members comprise a rack and a pinion gear which mesh with each other.

8. A corrugation forming method according to claim 1, wherein the thin metal plate is a lubrication steel plate composed of a steel plate and a lubrication film formed thereon.

9. A corrugation forming method according to claim 1, further comprising the steps of fixing the thin metal plate to the one of the first meshing members, wherein the one of the first meshing members is displaceable relative to the other of the first meshing members while the thin metal plate is fixed to the one of the first meshing members.

10. A corrugation forming method according to claim 9, wherein the one of the first meshing members and the one of the second meshing members are both fixed to a slideable member.

11. A method of forming a metal separator formed of a thin metal plate for a fuel cell having a plurality of streaky recesses and projections, the method comprising the steps of:

providing a first pair of meshing members that mesh with each other with a predetermined clearance therebetween, the predetermined clearance being greater than the thickness of the metal separator material;

placing the metal separator material between the first meshing members;

displacing one of the first meshing members relative to the other of the first meshing members in synchronism while the metal separator material is placed between the first meshing members to successively form streaky recesses and projections along the entire width of the metal separator material; and removing the metal separator material having successively formed recesses and projections, wherein the first meshing members are driven in synchronism with a displacement synchronization mechanism that includes a second pair of meshing members, wherein one of the second meshing members is fixed relative to the one of the first meshing members and the other of the second meshing members is fixed relative to the other of the first meshing members, and wherein the second meshing members mesh with each other with no allowance therebetween to accurately displace the one of the first meshing members relative to the other of the first meshing members.

12. A method according to claim 11, wherein the metal separator material is fed to the region where the first meshing members mesh with each other, while the metal separator material is brought into contact with the one of the first meshing members.

13. A method according to claim 11 or 12, further comprising the step of successively forming recesses and projections having desired final shapes on the metal separator material.

14. A method according to claim 11, wherein the first meshing members comprise rack and pinion members each having teeth.

15. A method according to claim 14, wherein the teeth of the pinion member each have a generally trapezoidally shaped cross section, and the teeth of the rack member each have a generally trapezoidally shaped cross section.

16. A method according to claim 14, wherein the teeth of the pinion member each have an involute shaped cross section, and the teeth of the rack member each have an involute shaped cross section.

17. A method according to claim 11, wherein the second meshing members comprise a rack and a pinion gear which mesh with each other.

18. A method according to claim 11, wherein the metal separator material is a lubrication steel plate composed of a steel plate and a lubrication film formed thereon.

\* \* \* \* \*